United States Patent [19]

Goodrich et al.

[11] Patent Number: 4,701,841
[45] Date of Patent: Oct. 20, 1987

[54] SYSTEM FOR ALTERING DATA TRANSMISSION MODES

[75] Inventors: Gerald O. Goodrich, Bellingham; Michael M. Tehranian, Acton; Donald A. White, Westminster, all of Mass.

[73] Assignee: Digital Equipment Corporation, Maynard, Mass.

[21] Appl. No.: 633,945

[22] Filed: Jul. 25, 1984

[51] Int. Cl.[4] ............................................. G06F 13/38
[52] U.S. Cl. .................................................... 364/200
[58] Field of Search ................................ 364/200, 900

[56] References Cited

U.S. PATENT DOCUMENTS

| | | |
|---|---|---|
| 3,815,099 | 6/1974 | Cohen et al. .......................... 364/200 |
| 3,828,325 | 8/1974 | Stafford et al. ....................... 364/200 |
| 4,057,846 | 11/1977 | Cockerill et al. . |
| 4,080,649 | 3/1978 | Calle et al. . |
| 4,090,239 | 5/1986 | Twibell et al. . |
| 4,110,823 | 8/1978 | Cronshaw et al. . |
| 4,115,856 | 9/1978 | Labeye-Voisin et al. ........... 364/200 |
| 4,189,769 | 2/1980 | Cook et al. . |
| 4,494,196 | 1/1985 | Greer . |

Primary Examiner—Thomas M. Heckler
Attorney, Agent, or Firm—Finnegan, Henderson, Farabow, Garrett & Dunner

[57] ABSTRACT

The present circuitry operates with a computer system which employs a CPU, memory, and other data handling devices such as peripherals and terminals. All of the foregoing elements of the computer system are connected to a major signal bus. The computer system functions by transmitting data and instructions from one element to another in accordance with a principal protocol. However, the present system does provide for decoding address signals, which are transmitted on the major signal bus, and if such address signals are acceptable to the memory then a new set of timing signals and a new set of protocol control signals are generated. In response to these new timing signals and new protocol control signals, data is transferred between the memory and the CPU at a faster rate and under a different protocol than the principal protocol thereby making the computer system function faster than heretofore.

10 Claims, 4 Drawing Figures

SYSTEM FOR ALTERING DATA TRANSMISSION MODES

BACKGROUND

In general, computer systems employ a central processor unit (CPU), a memory (or memories) and a variety of peripherals sometimes referred to as input-output (I/O) devices. Further, in general, these computer members are connected together by a sophisticated main bus device. When a CPU wants to interrogate a peripheral, a set of address signals is sent down the sophisticated bus to all of the peripherals and the particular peripheral which responds to the address signals quite often sets a latch device or a flag device. Thereafter, a strobe signal, or a read signal, or write signal is transmitted and the selected peripheral in response transmits its message to the CPU or alternatively accepts a message from the CPU.

A major problem in the foregoing arrangement is that the physical distance from the CPU to the peripherals, as measured along the bus, is considerable in terms of transmission time. In other words, it takes a finite amount of time for a signal to travel from the CPU to the furthermost connected peripheral. Even though the selected peripheral may be relatively close to the CPU, the system must wait (before any further action is taken) as though the transmitted signal is being sent to the furthermost peripheral. In addition, the main bus lines provide capacitance to the system and the system must wait until the transmitted signals "settle down".

In reviewing the problem, we recognized that the largest percentage of the signals transmitted were from the CPU to the memory and vice versa. We further recognized that if we located the memory close to the CPU and had the frequently transmitted messages operate at a fast time between the CPU and the memory we would improve the overall speed operation of the system. In addition we determined that the memory could operate with a larger address configuration than the peripherals without expensive alterations to the memory. Accordingly we conceived a new approach to handling of the data transmissions. Our new concept enables the new computer system to determine that the address being transmitted is intended for the memory and, if so, the protocol is changed and the signal speed increased but all of the data flow remains over the main bus so that the protocol and speed of transmission is not changed for the peripherals.

SUMMARY

In a preferred embodiment, the present arrangement provides a decoder circuit in memory. When a set of address signals is transmitted from the CPU along the main bus, the decoder circuit decodes at least a portion of the address signals and if it is determined that the memory is being addressed, the decoder generates a first control signal. The first control signal is transmitted to the CPU to initiate a faster set of timing signals from a dedicated "faster" timing signal circuit. In addition, the first control signal acts to block any strobe signals which may be sent later on to the peripherals connected to the main bus. The faster timing signal circuit in turn generates control signals which select different parts of the memory and which select a multiplexer to cooperate therewith. Accordingly the number of data words handled can be doubled in a normal memory cycle thereby providing a greater memory data rate without changing the principal protocol. With this arrangement the memory responds to the CPU more quickly than it would have responded if the system had to wait for the full transmission time (to the end of the peripheral path), and a greater amount of data information can be handled by memory without changing the protocol related to the peripherals.

BRIEF DESCRIPTION OF THE DRAWINGS

The objects and features of the present invention will be better understood after studying the following description taken in conjunction with the drawings wherein.

DESCRIPTION OF THE PREFERRED EMBODIMENTS

Figure 1:
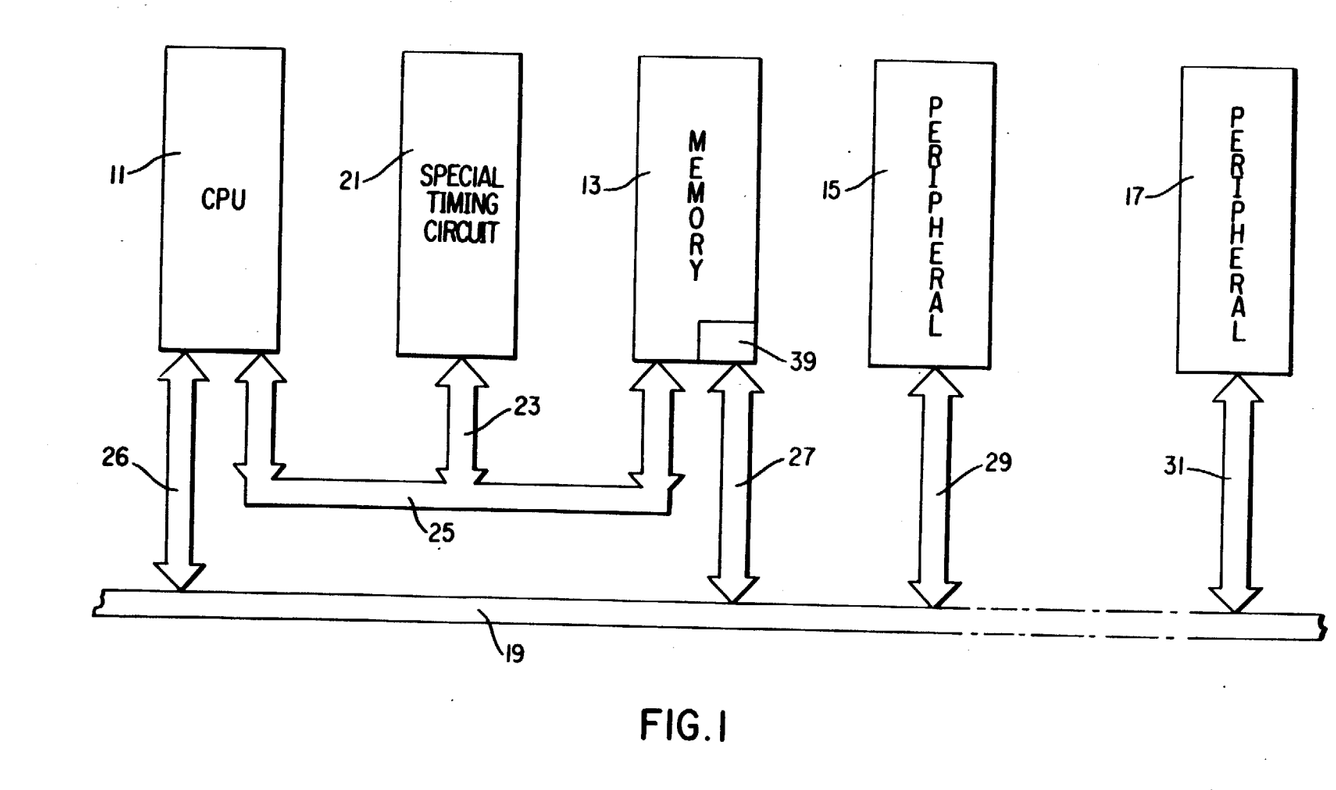
FIG. 1 is a block diagram of the system.

Consider FIG. 1 wherein is shown a CPU 11, a memory 13, and two peripherals 15 and 17. As can be seen in FIG. 1 the CPU 11, the memory 13, and each of the peripherals 15 and 17 are connected to a bus 19. The bus 19 is a sophisticated bus such as the LSI-11 data bus manufactured by Digital Equipment Corporation (DEC) and employed in DEC systems. As can be seen in FIG. 1 the bus 19 is shown by dashed lines between the connections of the peripherals 15 and 17 to indicate that a plurality of such peripherals could be connected thereto.

Also in FIG. 1 it can be seen that there is a special timing circuit 21 which is connected through channel 23 to a private memory interconnect (PMI) bus 25 which connects the timing circuit 21 to both the memory 13 and the CPU 11. It should also be understood that the memory 13 is directly connected to the CPU 11 by virtue of the private memory interconnect bus 25. The system shown in FIG. 1 is a portion of a computer system and it should be understood that the CPU can send address signals as well as data signals along the main bus 19. When the CPU 11 is programmed to send a set of address signals down the main bus 19, those address signals pass along each of the interconnects 27, 29, and 31. It should be understood that there can be a large number of interconnects between 29 and 31, all of which would be connected to the main bus 19. If a set of address signals is intended to select, for instance, the remote peripheral 17, then those address signals would pass along main bus 19 and through the proper gate arrangement in the interface of the peripheral 17. The circuitry of the interface would set a latch so that at some later time when the CPU 11 transmits a strobe signal, down the main bus 19, the peripheral 17 would respond.

When a set of address signals is transmitted as just described, it takes a relatively long time for the address signals to reach the interconnect 31 and therefore to reach the peripheral 17. If the entire computer system coupled to bus 15 is rather large, it is conceivable that address signals would reach either the proximate peripheral 15, or the memory 13, long before those signals would reach the remote peripheral 17. However, a conventional system has to wait until enough time has elapsed to be certain that the signals have in fact reached the peripheral 17, especially if those signals were intended to reach the peripheral 17. Accordingly, time is wasted when the address signals were intended for the peripheral 15 or the memory 13.

As mentioned above, we discovered that the vast majority of the signals are transmitted between the CPU and the memory and hence in the preferred embodiment the memory is connected to the CPU by a private memory interconnect 25 which very often is the order of six inches along the backboard wiring. In accordance with the present system, when the CPU 11 is addressing the memory 13, the address signals are still transmitted over the interconnect 26 and along the main bus 19, as with the addressing of other subsystems along bus 19. Decoding circuitry 39 in memory 13 receives and decodes a portion of those address signals. If decoding circuitry 39 in memory 13 determines that the address represented by the address signals is intended for memory then decoding circuitry 39 transmits a first control signal along the private memory interconnect (PMI) 25 to the CPU 11.

The first control signal acts in the CPU 11 to initiate a timing signal, which could also be a different control signal, to the timing circuitry 21. Such a timing signal is transmitted over the PMI 25 and along the interconnect 23 to the special timing circuitry 21. The special timing circuitry 21 in turn generates memory control signals which are transmitted over the interconnect 23, and over the PMI 25, to the memory 13. At the memory 13, some of the memory control signals act to set up bus driver/receivers to accept data from the main bus 19, and some of the memory control signals further act to generate "enable" signals to one of two sections of the memory 13.

The address signals are accepted by memory 13 and applied to two sections of memory 13 simultaneously in the preferred embodiment shown. The timing circuitry 21 preferably further transmits a multiplexer select signal over PMI 25 to memory 13 which acts to select a multiplexer. The multiplexer is connected to operate with the sections of the memory 13 which have been addressed and selects one such section at a time. Accordingly the memory 13 can handle twice the number of data signals within a single memory cycle. Since the number of data signals can be doubled, the effective speed of the memory is thereby increased and hence the system operates to handle more memory information in less time, than under the principal protocol arrangement.

As can be determined by the block diagram of FIG. 1 and the preceding description, the present system provides for changing the mode of data transmission by changing the protocol and by changing the timing signals. This is done without reconfiguring of the system to accomodate the peripherals and without necessitating any additional changes to the main bus.

Figure 2:
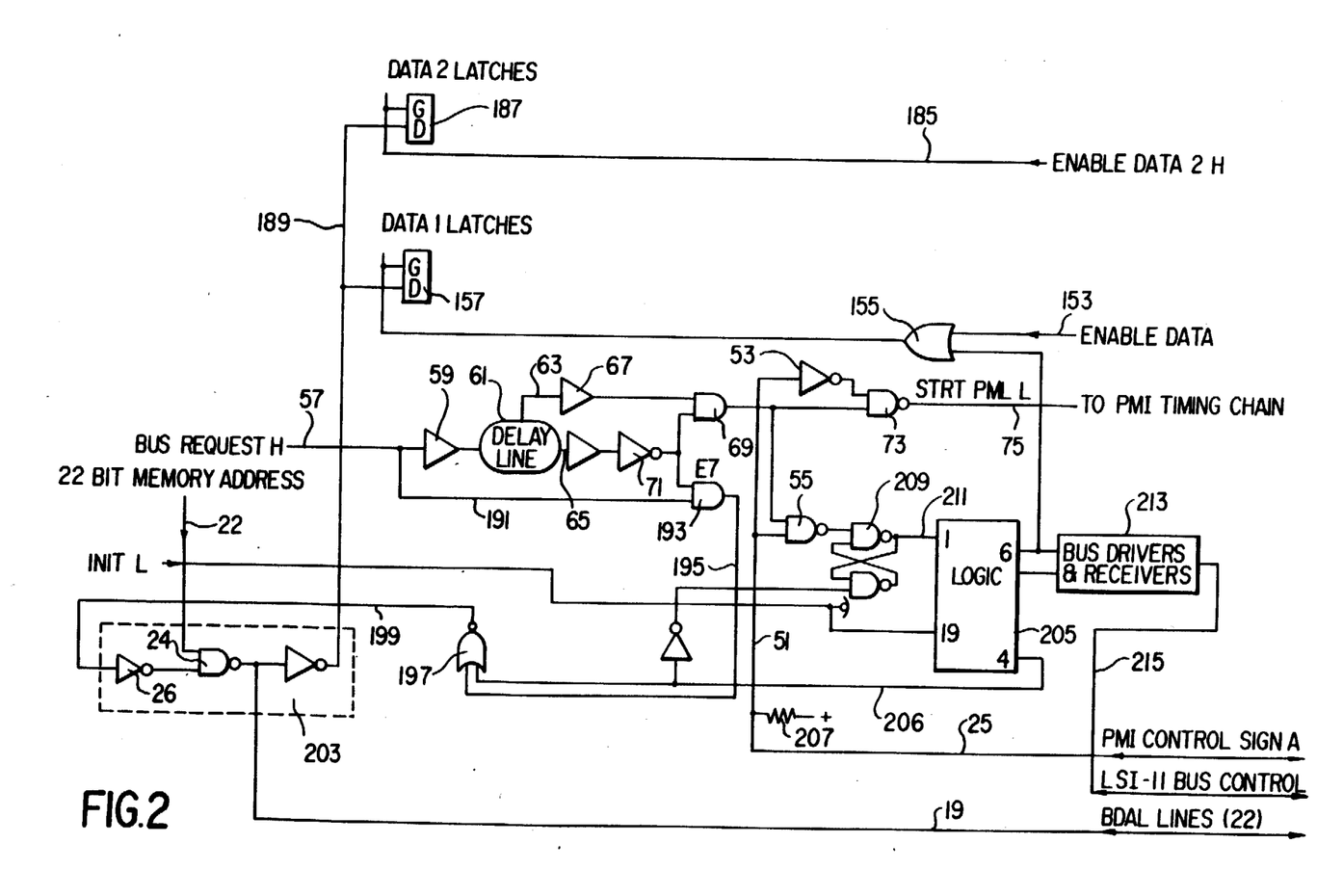
FIG. 2 is a schematic block diagram of a portion of the CPU related to the present invention.
Figure 3:
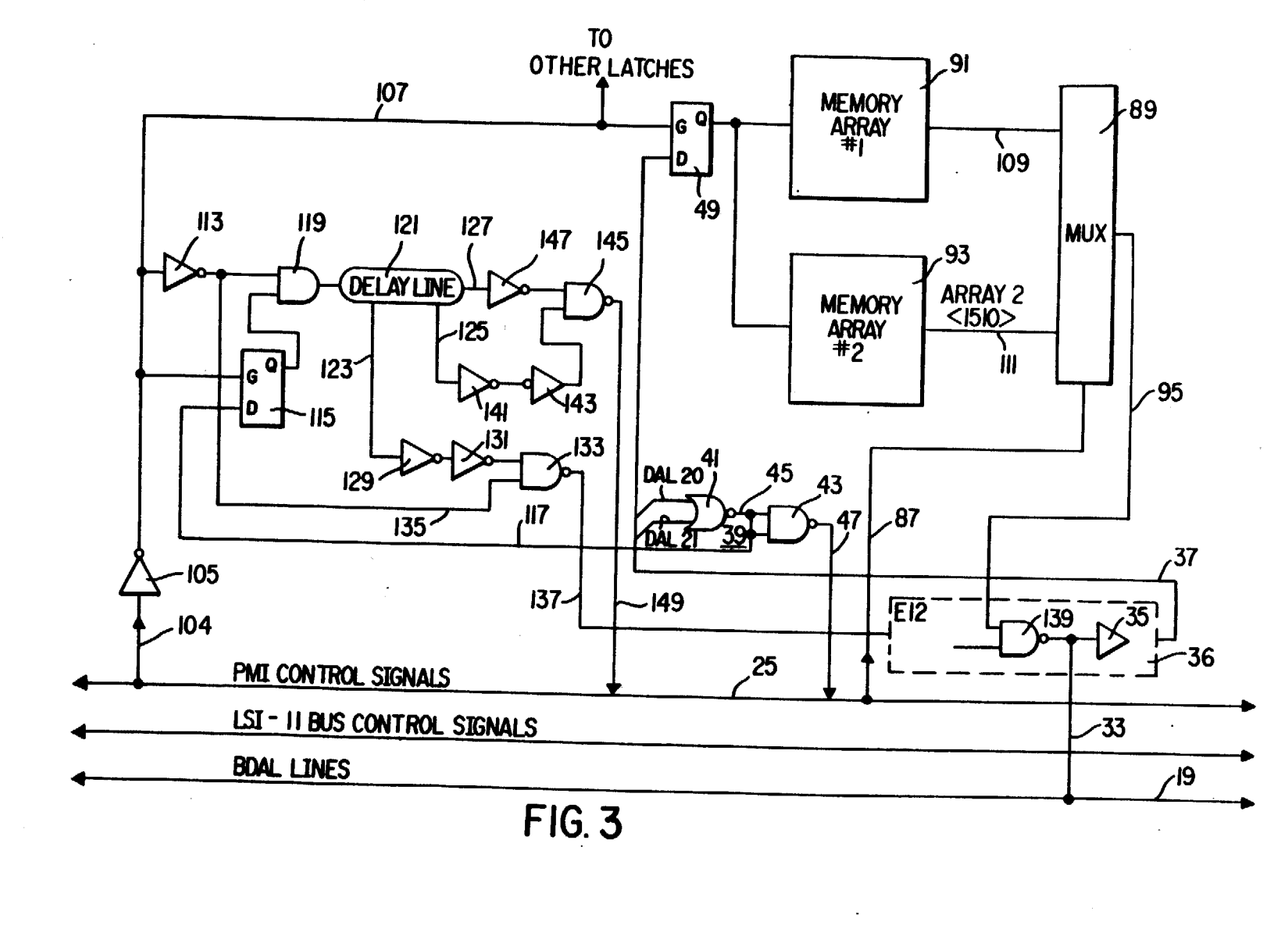
FIG. 3 is a schematic block diagram of a portion of the memory related to the present invention.
Figure 4:
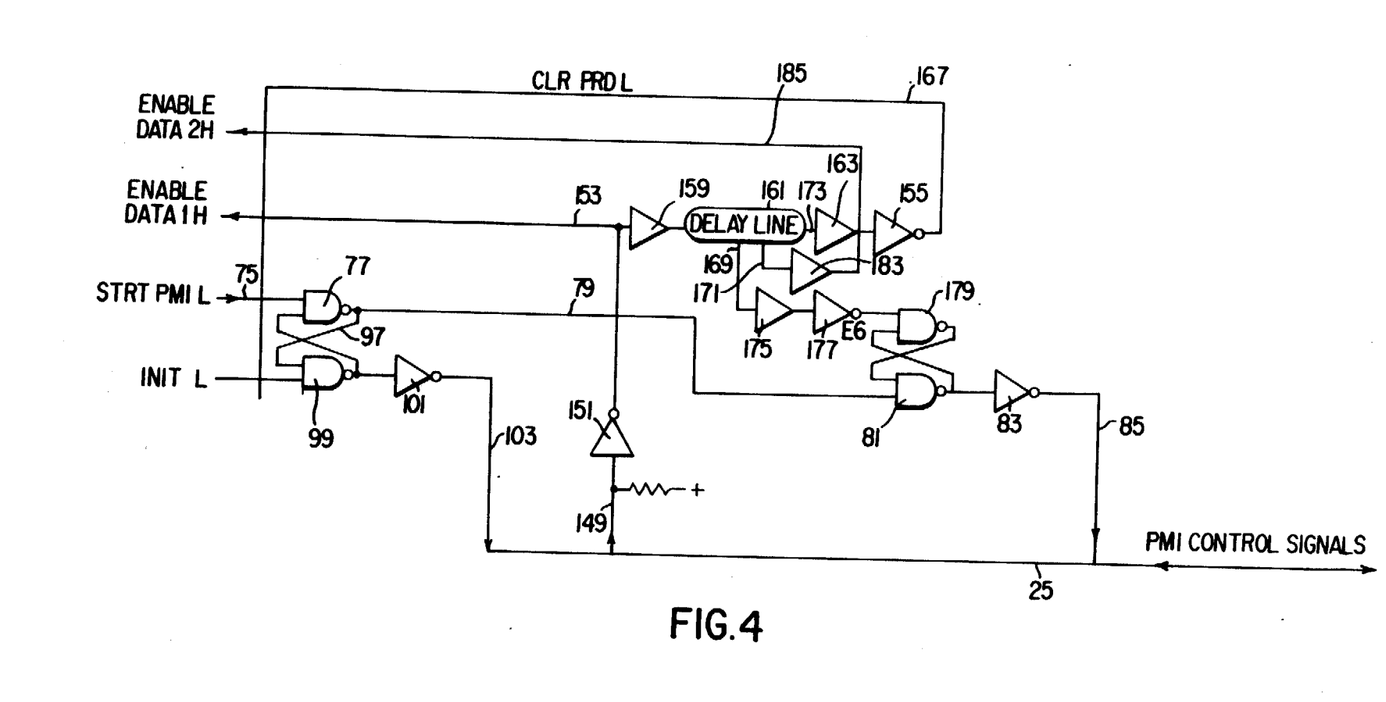
FIG. 4 is an embodiment of a faster timing circuitry which may be employed with the present invention.

Consider FIGS. 2, 3, and 4 which show schematic block diagrams of respectively a portion of the CPU 11, a portion of memory 13, and a portion of the timing circuitry 21. The placement of address signals on main bus 19 will be dealt with in more detail when discussing FIG. 2. For the moment let us assume that the CPU 11 has generated the address signals on the main bus 19. We find that in FIG. 2 those address signals pass along the main bus 19 to the right (in the drawing) and appear on main bus 19 in FIG. 3. The address signals will be transmitted over the interconnect 33, through the receivers 35, along the lines 37 to the decoder circuitry 39. The decoder 39 is made up of an NOR gate 41 whose output is connected a NAND gate 43. If we consider, for the purposes of demonstrating a concept of this invention that we desire the high speed memory 13 to respond to addresses from 0 through 03,777,777 (octal), and if we further consider that we have a twenty-two bit memory address, then the data address lines twenty and twenty-one (DAL 20 and 21) should never have a "1" (i.e., should both always be "0"). If either of the data address lines, twenty or twenty-one (DAL 20 or DAL 21), has a "1", then the memory 13 is not being addressed. Accordingly as can be seen in FIG. 3, the decoder employs the NOR gate 41 which is connected to the DAL 20 and DAL 21 output from receiver 35. If both of those lines are "0", or low, then there will be a low input signal on both inputs to the NOR gate 41 and accordingly a high output signal on the line 45. The high signal on line 45 will provide a low signal on line 47. The low signal on line 47 is the first control signal operating in response to the decoding of the signals on DAL 20 and DAL 21. Other forms of decoding arrangements could also be used. It should be also understood that while the decoder circuitry 39 is shown in the memory, it could also be located in the CPU or some other location.

The address lines 37 are further connected to latches of which the latch 49 is exemplary. The description of latch 49 will be provided below.

The first control signal on line 47 is transmitted to the PMI 25, shown in FIG. 2 and FIG. 3 and along the interconnect 51 shown in FIG. 2. The control signal on line 51 is transmitted to the inverter 53 as well as to the NAND gate 55.

It must be remembered that we have briefly dealt with the address signals being placed on the main bus 19. In the normal operation, after the address signals are present on the main bus 19 there is a "bus request signal" transmitted on line 57 (FIG. 2). The "bus request signal" on line 57 is transmitted through the buffer 59 to the delay line 61. In the preferred embodiment circuit elements 59, 61, 65, and 67 make up a delay line, manufactured by Pulse Engineering Incorporated and identified by number 21214. As can be seen in FIG. 2, the delay line 61 has two taps. The first tap being connected to the line 63 while the second tap 65 is at the end of the delay line. As the "bus request signal" travels along the delay line 61 it is tapped off on the line 63 to pass through the buffer 67 to the AND gate 69. The other input to the AND gate 69 comes from the inverter 71. The output from inverter 71 is high unless of course there is a high input signal thereto. Accordingly, for a period of time determined by delay line 61, there can be two high signals present on the NAND gate 69 to provide a high signal to the AND gate 73.

The first control signal which was described earlier as being transmitted on the PMI 25 is further transmitted along the interconnect line 51 to the inverter 53 where it is inverted and buffered as a high signal to the NAND gate 73. Accordingly, when the NAND gate 73 has two high inputs it provides a low output signal which is "Start PMI" signal on line 75. The "Start PMI" signal on line 75 is transmitted, as can be seen in FIG. 4, to the NAND gate 77 of a latch comprising cross-coupled NAND gates 77 and 79. The output of NAND gate 77 is a read signal on line 79.

The read signal on line 79 is an output the NAND gate 81 which is part of a latch comprising NAND gates 81 and 79. The output of gate 81 is an input to the inverter 83 whose output is transmitted on line 85 as a multiplexer select signal. The multiplexer select signal is transmitted on the PMI bus 25 and, as can be seen in FIG. 3, is transmitted along the interconnect 87 to the multiplexer 89. The multiplexer select signal 87 selects the multiplexer 89 so that information signals from either the memory array 91 or the memory array 93 can be transmitted through the multiplexer 89 along the data lines 95. It should be understood that while only one bus driver/receiver circuit 36 is shown in FIG. 3, in fact there is one such bus drivers receiver for each of the data lines emerging from the multiplexer 89.

While we have described the selection of the multiplexer, we have to consider how the memory arrays 91 and 93 are addressed to select the proper information for transmission from those memory arrays. The foregoing is accomplished by an additional control signal from the timing circuitry 21.

In FIG. 4 we find that the read signal 79 is also transmitted along the interconnect wire 97 to the NAND gate 99. The read signal is passed through the NAND gate 99 (assuming INITL is low) to the inverter 101 where it is converted to provide a read signal on line 103. The read signal on line 103 is transmitted along the PMI bus 25 to the interconnect 104 in FIG. 3. The read signal on interconnect 104 is transmitted through the inverter 105 where it is converted to a low signal. The read signal (now low) in turn is transmitted to the latch 49. It will be remembered that the address signals which were present on the main bus 19 and which were transmitted along the interconnect 33, through the receiver 35 were transmitted along the lines 37 to the latch(es) 49. Those signals are present at the "D" terminals of the latches 49. When the read signal on line 107 reaches the gate terminals of the plurality of latches 49, all of those latches are fully conditioned to provide signals to the input terminals of the memory sections 91 and 93. Since the proper address signals have been transmitted to both memory sections 91 and 93, it is only a matter of selecting the output lines 109 or output lines 111 which transmit the particular data signals from the arrays to the multiplexer 89 and therefrom along the lines 95. The information signals being transmitted along the lines 95 are transmitted through the bus driver/receivers 36 back onto the main bus 19 to CPU 11.

When the read signal has been transmitted through the inverter 105 in FIG. 3, it is further transmitted to the inverter 113 as well as to the gate terminal of latch 115. It will be recalled that when both of the input signals on the DAL 20 and DAL 21 are "0" there is a first control signal generated. Above we have discussed the operation of that control signal from the line 47. In addition, as we examine FIG. 3 we find that the first first control signal is also transmitted from line 45, along the line 117, to the D terminal of latch 115. As long as the address signals are present (and decoded) there is signal applied to the D terminal of the latch 115. While the first control signal is present at the D terminal of latch 115, the read signal from the inverter 105 appears on the gate terminal of latch 115 and hence latch 115 provides an output signal to the AND gate 119. Virtually, simultaneously therewith, the output signal from inverter 113 provides a high signal to the AND gate 119. Hence the first control signal is transmitted along the delay line 121. It will be noted that there are three taps along the delay line 121: the tap represented by the interconnect 123, the tap represented by the interconnect 125, and of course the end of the delay line represented by the line 127.

The signal from the first tap, on line 123, passes through the inverters 129 and 131 to the NAND gate 133. At the same time the read signal described earlier on line 104 and output from inverter 113 is present on the line 135 to fully condition the NAND gate 133. The delay window provided by the delay line 121, as reflected in the signal on line 137, provides enough time for the data in the memory arrays 91 and 93 to be read out through the multiplexer 89 to the bus driver/receiver devices 36. In each bus driver/receiver device 36 there is an NAND gate 139 and the input from the line 137 fully conditions these NAND gates to enable the data signals on lines 95 to be transmitted to the main bus 19.

The second tap 125 of the delay line 121 takes the first control signal and transmits it through the inverting buffers 141 and 143 to the NAND gate 145. The other input to the NAND gate 145 is from the end of the delay line 121 via line 127, through the amplifier (inverter) 147. The purpose of having this double delay and the conditioning by the NAND gate 145 is to generate a pulse at the output of NAND gate 145. The output from the NAND gate 145 is transmitted on line 149, along PMI 25, to line 149' the timing circuit 21 shown in FIG. 4.

The signal on line 149', shown in FIG. 4, is transmitted through the inverter 151 to the line 153. The signal on line 153 is transmitted as an enable data signal (ENABLE DATA 1H) to the CPU 11, as can be seen in FIG. 2. The enable data signal on line 153 is transmitted through the OR gate 155 to the gate terminals of the latches 157. As shown in FIG. 4 we find that the ENABLE DATA 1H signal is also transmitted through the buffer 159, through the delay line 161, through the buffer 163, through the inverter 165 and along the line 167, and becomes a clear signal CLR PRDL. In other words, after the system has been operated, all of the latches etc., are cleared via this signal.

Delay line 161 has three taps. The first tap is represented by the line 169, the second tap is represented by the line 171, while the third tap at the end of the delay line is represented by the line 173. The signal on line 169 provides the second multiplexer select signal on line 85. The manner in which that signal generated is that the signal on line 169 passes through the buffer 175, and into the inverter 177, through the NAND gate 179 in a latch comprising NAND gates 179 and 81. In that latch the output of NAND gates 179 and 81. In that latch, the output of NAND gate 179 is line 181 which provides an input to NAND gate 81. The second multiplexer select signal is generated from an output of that latch, at NAND gate 81, which passes through inverter 83 to provide a second timed multiplexer selector signal on line 85.

The signal on line 171, from the delay line 161, is transmitted through the buffer 183 and along the line 185 to provide a second enable data signal, ENABLE DATA 2H. The second enable data signal on line 185 operates very similarly to the first enable data signal on line 153 but the destination and operation are different, as seen in FIG. 2. In FIG. 2 the ENABLE DATA 2H signal signal on line 185 is transmitted to the gate terminals of the latches 187. The latches 157 and 187 provide the de-multiplexed signal to the CPU and they operate in response to data signals being present on the lines 189.

As FIG. 2 shows, those data signals are received from bus 19 via bus driver/receivers 203.

As alluded to briefly in the discussion of FIG. 2, address signals are placed on the main bus 19 when the bus request signal was generated. The address signals are actually present on lines 22 prior to the generation of the bus request signal. The address signals remain present on the main bus 19 as long as the NAND gate 24 remains fully conditioned. The high output from NOR gate 197 fully conditions the NAND gate 24.

The bus request signal is transmitted along the line 191 to the AND gate 193. The AND gate 193 will be fully conditioned, until the delay expires, to provide an output signal on line 195 to the NOR gate 197. The bus request signal through the NOR gate 197 is transmitted along the line 199, to the NAND gates 24 of the bus driver/receivers 203. The NAND gates 24 are thus fully conditioned to transmit the address signals to the main bus 19 until the delay expires. When the delay expires the NAND gate 193 provides a low signal to the NOR gate 197 which passes through the inverter 26 to provide a low signal to NAND gate 24 thus terminating the presence of the address signals on the main bus 19.

In FIG. 2 there is also shown a direct memory access logic circuit 205. That logic circuit is not described herein because it is unrelated to the invention but it should be understood that that logic circuit is in operation if the system is operating under the principal protocol. The way in which that logic is enabled is that if the decoder circuit 39 in FIG. 3 does not detect that the address is directed at the memory then there will be no first control signal on line 47. If there is no first control signal on line 47 then no signal is transmitted along the PMI 25 in FIG. 2. However, the resistor 207 shown in FIG. 2 is connected to a high potential and hence the input to NAND gate 55, is held at a high potential, as is the input to inverter 53. With the inverter 53 being held at a high potential there is a low signal applied to the NAND gate 73 and hence that NAND gate is not fully conditioned.

On the other hand, with a high signal being present at the input of the NAND gate 55, when the bus request signal comes through from the AND gate 69, those two high signals provide a low output which is then an input to the NOR gate 209. The latch comprising NAND gate 209 then provides a high signal on the line 211. The logic circit 205 responds to the high signal on line 211 to provide signals to the bus drivers 213 which are connected to the normal bus control line 215 and accordingly the system operates with the principal protocol instead of the special protocol that has been described heretofore. In addition, the output signal on line 206 is high for a longer period of time than that provided by the output of AND gate 193 so that the NAND gate 24 permits the address signals to be present for a longer period under the normal protocol than under the special protocol.

The present system has the advantage of cutting short the time required to transmit data and instructions between the CPU and the memory or indeed between the CPU and the other device if it should be so desired. The system operates to decode addres signals and determine if the memory, in the preferred embodiment, can handle the address that is being sought. If the memory handles the address being sought then the system goes into a mode of operation which provides faster timing cycle and more information in each cycle both of which enhance the overall operation of the computer system.

We claim:

1. A data transmission system comprising
    processor means for generating and outputting peripheral addresses and for exchanging data via a first data bus, said processor means further including first cont means for exchanging control signals via a second data bus;
    first peripheral system means, coupled to said processor means via said first data bus, for responding to a first one said peripheral addresses by exchanging said with said processor means along said first data bus at a first data rate; and
    second peripheral system means, coupled to said processor means via said first and second data buses, for responding to a second one of said peripheral addresses by exchanging said data with said processor means via said first data bus at a second data rate greater than said first data rate, said second peripheral system means further including second control means for exchanging signals with said processor means via said second data bus to permit said second peripheral means to exchange said data at said second data rate.

2. The data transmission system of claim 1 further including timing means, coupled to said second data bus, for providing timing and control signals for exchanging data at said second data rate;
    wherein said second control means of said second peripheral system means includes decoding means, coupled to said first and second buses, for decoding said peripheral addresses and for producing a control signal on said second data bus in response to said second one of peripheral addresses; and
    wherein said first control means of said processing means includes means for generating a timing signal on said second data bus in response to said control signal to activate said timing means.

3. The data transmission system of claim 2 wherein said timing means includes means for generating a peripheral control signal in response to said timing signal to activate said second peripheral system means for exchanging data at said second data rate.

4. The data transmission system of claim 3 wherein said second peripheral system means includes a memory system.

5. The data transmission system of claim 4 wherein said memory includes
    two memory sections; and
    a multiplexer coupled to said two memory sections for selecting outputs from said memory sections.

6. The data transmission system of claim 5 wherein said first control means of said processor means is responsive to a bus request signal and includes
    signal delay circuitry for producing a delayed output signal delayed by a predetermined amount from said bus request signal; and
    logic circuitry for producing said timing signal from said delayed output signal and said control signal.

7. The data transmission system in claim 1 wherein said processor means includes a central processor unit and said second peripheral system means includes a memory system used by said central processor unit.

8. The data transmission system of claim 7 wherein said first peripheral system means includes an input/output device.

9. The data transmission system in claim 1 further including timing means, coupled to said second peripheral system means and to said processor means for providing timing and control signals for exchanging data between said second peripheral system means and said processor means at said second data rate.

10. The data transmission system of claim 1 wherein said second peripheral system means is located physically closer to said processing means along said first data bus than is said first peripheral system means.

* * * * *

UNITED STATES PATENT AND TRADEMARK OFFICE
CERTIFICATE OF CORRECTION

PATENT NO. : 4,701,841

DATED : October 20, 1987

INVENTOR(S) : Gerald O. Goodrich, et al

It is certified that error appears in the above-identified patent and that said Letters Patent is hereby corrected as shown below:

In Claim 1, Column 8, Line 6; change

"cont" to --control--

Signed and Sealed this

Sixth Day of September, 1988

*Attest:*

DONALD J. QUIGG

*Attesting Officer*   *Commissioner of Patents and Trademarks*